US005347856A

United States Patent [19]

Miyata et al.

[11] Patent Number: 5,347,856

[45] Date of Patent: Sep. 20, 1994

[54] MISFIRE DETECTOR DEVICE FOR USE IN AN INTERNAL COMBUSTION ENGINE

[75] Inventors: Shigeru Miyata; Yoshihiro Matsubara; Junichi Kagawa, all of Nagoya, Japan

[73] Assignee: NGK Spark Plug Co., Ltd., Nagoya, Japan

[21] Appl. No.: 25,346

[22] Filed: Mar. 3, 1993

[30] Foreign Application Priority Data

Mar. 3, 1992 [JP] Japan .............................. 4-045428

Mar. 3, 1992 [JP] Japan .............................. 4-045429

[51] Int. Cl.[5] .............................. G01M 15/00

[52] U.S. Cl. .............................. 73/116; 324/378

[58] Field of Search .............................. 73/116, 117.3, 35 I; 324/399, 380, 378; 123/169 R, 169 EL

[56] References Cited

U.S. PATENT DOCUMENTS

| | | | |
|---|---|---|---|
| 1,214,471 | 1/1917 | Jeffrey | 123/169 EL |
| 1,255,880 | 2/1918 | Hill | 123/169 EL |
| 3,942,102 | 3/1976 | Kuhn et al. | 324/399 |
| 4,112,905 | 9/1978 | Stöcket et al. | 123/169 EL |
| 4,648,367 | 3/1987 | Gillbrand et al. | 123/425 |
| 5,046,470 | 9/1991 | Entenmann et al. | 123/481 |

FOREIGN PATENT DOCUMENTS

| | | | |
|---|---|---|---|
| 52-54818 | 5/1977 | Japan . | |
| 0117175 | 5/1988 | Japan | 123/169 EL |
| 4255573 | 9/1992 | Japan | 123/169 EL |

*Primary Examiner*—Robert Raevis

*Attorney, Agent, or Firm*—Sughrue, Mion, Zinn, Macpeak & Seas

[57] ABSTRACT

In a misfire detector device for use in internal combustion engine, an electrical interrupter circuit on-off actuates a primary current flowing through a primary circuit of an ignition coil to induce a spark plug voltage. A check diode is provided in a secondary circuit of the ignition coil to prevent a current flowing back to the ignition coil. The spark plug has a center electrode, a front end of which is projected from an insulator, and an outer surface area of the projected front end being 25 $mm^2$ or more. A spark plug voltage detector circuit detects an attenuation time length of a spark plug voltage waveform presented subsequent to a predetermined time period occurring after an end of a spark action of the spark plug. On the basis of the attenuation time length, a distinction circuit determines whether a misfire occurs in a cylinder of an internal combustion engine.

6 Claims, 17 Drawing Sheets upon running an engine at low revolution

MISFIRE DETECTOR DEVICE FOR USE IN AN INTERNAL COMBUSTION ENGINE

BACKGROUND OF THE INVENTION

1. Field of the Invention

This invention relates to a misfire detector device for use in an internal combustion engine which is conceived on the finding that a spark plug gap resistance is distinguishable in the case in which a spark ignites an air-fuel mixture gas from the case in which the spark fails to ignite the air-fuel mixture gas injected in a cylinder of the internal combustion engine.

2. Description of Prior Art

With the demand of purifying emissions and enhancing fuel efficiency of internal combustion engines, it has been necessary to detect the firing condition in each cylinder of the internal combustion engine so as to protect the internal combustion engine against any type of misfire. In order to detect the firing condition in each of the cylinders, an optical sensor has been installed within the cylinders. Further, a pressure-sensitive element has been attached to a seat pad of the spark plug, or the ion current due to an ignition circuit has been measured.

However, it is troublesome and time-consuming to install the optical sensor to each of the cylinders, thus increasing the installation cost, and at the same time, taking much time in carrying out periodic checks and maintenance. In addition, a high voltage withstanding diode is needed to introduce the ion current to a secondary circuit.

Therefore, it is an object of the invention to provide a misfire detector device for use in an internal combustion engines which is capable of precisely detecting a misfire by checking a spark plug voltage waveform applied to the spark plug installed in each cylinder of the internal combustion engine. A further object is to create the device with a relatively simple structure, and that is easy to install and maintain.

SUMMARY OF THE INVENTION

According to the invention, there is provided a misfire detector device for use in an internal combustion engine which is equipped with either a distributor type or a distributorless type of ignitor (DLI). The misfire detector device includes a spark plug having a center electrode, a front end of which is projected from an insulator, and an outer surface area of the projected front end being 25 $mm^2$ or more; a voltage divider circuit which detects a divided voltage of the spark plug voltage applied across electrodes of the spark plug; a spark plug voltage detector circuit which detects attenuation characteristics of a spark plug voltage waveform presented subsequent to a predetermined time period after an end of a spark action of the spark plug; and a distinction circuit which determines, on the basis of the attenuation time length of the attenuation characteristics, whether or not the spark ignites an air-fuel mixture.

According further to the invention, there is provided a misfire detector device for use in an internal combustion engine which is equipped with a distributor type or distributorless type of ignitor. The misfire detector device includes a spark plug having a center electrode, a front end of which is projected from an insulator, and an outer surface area of the projected front end being 25 $mm^2$ or more; a voltage charging circuit which induces an electromotive voltage in the secondary circuit of the ignition coil by energizing the primary circuit, and deenergizing it after a certain period of time at a predetermined after an end of a spark action due to an inductive discharge of the spark plug when the engine runs at a low revolution with a low load; a voltage divider circuit which detects a divided voltage of the spark plug voltage applied across electrodes of the spark plug; a spark plug voltage detector circuit which detects attenuation characteristics of a spark plug voltage waveform presented subsequent to a time period predetermined either during a spark action of the spark plug or after an end of the spark action when the engine runs at a high revolution, and detecting attenuation characteristics of a spark plug voltage waveform derived from the voltage charging circuit when the engine runs at a low revolution with a low load; and a distinction circuit which determines on the basis of the attenuation characteristics whether or not the spark ignites an air-fuel mixture.

According further to the invention, there is provided a misfire detector device including a peak hold circuit, which provided to hold a peak voltage of the spark plug voltage waveform presented after the end of the spark action of the spark plug, so that the distinction circuit detects a misfire on the basis of a peak voltage level or the attenuation characteristics of the spark plug voltage waveform.

According further to the invention, there is provided a misfire detector device in which a front end of the center electrode has a middle axis including a nickel-alloyed clad and a heat-conductor core embedded in the clad. The middle axis has a projected portion projected from the insulator, and a ratio of n/L, which is determined such that the outer surface area of the projected portion residing between a front end surface of the middle axis and a front end of the heat-conductor core is less than half of the outer surface area of the front end, where L=the projected length of the front end of the center electrode, and n=a distance between the front end of the heat-conductor core and the front end surface of the middle axis.

According further to the invention, there is provided a misfire detector device in which an electrical connection is such that the projected front end of the center electrode is in the side of negative polarity.

This type of the misfire detector device is employed in a distributor or a distributorless ignition device. In this type of ignition device, electrical energy stored in the ignition circuit electrically charges the static capacity (10–20 pF) inherent in the spark plug immediately after the spark terminates. The charged voltage forms a sparkplug voltage of 5–8 kv when the internal combustion engine runs at a high revolution, while forming a spark plug voltage of 2–3 kv when the internal combustion engine runs at a low revolution. The spark plug voltage is rapidly discharged through the electrodes of the spark plug after the termination of the spark when the spark normally ignites the air-fuel mixture gas, since the combustion gas staying between the electrodes is ionized. When the spark fails to ignite the air-fuel mixture gas, the spark plug voltage is slowly released through the secondary circuit because the gas staying between the electrodes is free from ionized particles. The attenuation characteristics of the charged voltage depends on the density of the ionized particles of the combustion gas staying between the electrodes. When the ionized particles of the combustion gas are present between the electrodes, the attenuation characteristics hinge on the outer area of the electrodes, and the attenuation characteristics become short with the enlargement of the outer area of the electrodes because of the increased intensity of the ion current.

Therefore, whether or not misfire occurs in the cylinder of the internal combustion engine is determined by detecting an attenuation time length required for the spark plug voltage to descend to a predetermined voltage level from the peak hold voltage after monitoring the spark plug voltage between the check diode and the spark plug. In this instance, a descending ratio of the spark plug voltage may be measured against a peak value of the peak hold voltage.

Whether or not a misfire occurs is determined by detecting the attenuation characteristics of the spark plug voltage charged in the stray capacity after the end of the spark action, and comparing the characteristics with data previously measured or calculated according to the running conditions. In this instance, the ion current smoothly flows between the electrodes when an exposed area of the center electrode exceeds 25 $mm^2$ which is usually smaller than that of an outer electrode. This enables the precise detection of the misfire by reducing the interruption of the ion current flow due to deviation of combustion swirls in a cylinder of the internal combustion engine.

In the misfire detector device, in which a distributor is needed for an ignition device, there is provided a series gap (e.g. rotor gap) between the ignition circuit and the spark plug so as to work as an air gap. This results in a relatively small electrical energy stored in the ignition circuit after the termination of the spark when the engine runs at a low revolution. The small electrical energy often restricts the spark plug voltage level so as to make it difficult to precisely determine the attenuation characteristics of the spark plug voltage.

For this reason, the voltage charging circuit is provided to induce an enhanced level of the spark plug voltage at a predetermined time after the end of the spark action only when the engine runs at a low revolution. The enhanced level of the spark plug voltage is predetermined to be e.g. 5–7 kv which is high enough to break down the series gap of the distributor, but not enough to break down the spark gap, and thus electrically charging the stray capacity inherent in the spark plug. The discharging time length of the charged capacity changes depending on whether or not ionized particles are present in the combustion gas staying in the spark gap when the spark ignites the air-fuel mixture gas in the cylinder of the internal combustion engine.

The attenuation time length of the spark plug voltage is detected after the spark is terminated, in the same manner as previously mentioned, to determine whether misfire occurs in the cylinder of an internal combustion engine.

The spark plug voltage is induced by on-off actuating of the primary circuit of the ignition coil, or otherwise a certain level of the spark plug voltage is induced in the secondary circuit by providing a discrete step-up coil. The spark plug voltage is employed to electrically charge the stray capacity so as to detect the attenuation characteristics of the charged voltage in the spark plug electrode, the exposed front end of which has an outer surface area of 25 $mm^2$ or more.

Meanwhile, the spark plug voltage often becomes excessively enhanced after the termination of the spark so that an electrical discharge occurs between the electrodes of the spark plug when the engine runs at a high revolution with a high load. In this instance, the secondary voltage rapidly descends irrespective of the misfire since the voltage charged in the stray capacity is released at once. This makes it difficult to distinguish the misfire from the normal combustion only by detecting the attenuation characteristics of the spark plug voltage.

However, the enhanced voltage level of the spark plug voltage is quite remarkable in distinguishing the misfire from the normal combustion after the end of the spark action when the engine runs at the high revolution with the high load. That is to say, the spark is likely to be sustained when the spark normally ignites the air-fuel mixture gas to ionize the particles in the combustion gas, so that the spark exhausts the electrical energy reserved in the ignition circuit after the end of the spark action to enhance the spark plug voltage only by 3–5 kv.

As opposed to the enhanced voltage 3–5 kv, the enhanced spark plug voltage exceeds 10 kv when the misfire occurs in the cylinder of the internal combustion engine.

Therefore, whether or not the misfire occurs is determined by detecting the enhanced level of the spark plug voltage after the end of the spark action when the engine runs at the high revolution with the high load.

With the exposed area of the electrode being 25 $mm^2$ or more, its enlarged area makes it possible to excessively raise the temperature of the front end of the center electrode so as to cause a preignition. In order to avoid the preignition, the front end of the heat-conductor is placed in the proximity of the front end of the center electrode so as to facilitate the heat-dissipation through the heat-conductor. Such a configuration enables the device to avoid the loss of the endurance and the decrease of amount of heat due to the enlarged area of the center electrode.

Since the center electrode has a negative polarity, the anode ions are attracted to the center electrode and an electric current flows by exchanging the charged particles in the combustion flame. In this instance, the cathode ions are considered to stay around near the center electrode because the cathode ions are heavy and less mobile compared to the electrons. Consequently, the intensity of the current is determined by the mobility of the cathode ions. With the exposed area of the electrode being enlarged to be 25 $mm^2$ or more, the cathode ions are collected near to the center electrode to increase the intensity of the current so as to clarify the attenuation characteristics.

In the misfire detector device according to the invention, the exposed area of the center electrode is 25 $mm^2$ or more, so that the ion current flow is facilitated to insure the precise misfire detection irrespective of the swirl stream variation in the cylinder of the internal combustion.

This also makes it possible to obviate the necessity of the optical sensor, the pressure-sensitive element and the high-voltage withstanding diode, thus enabling to provide a misfire detector device which is capable of precisely detecting the misfire in each cylinder of the internal combustion engine, and easy in mounting on the engine, superior in maintenance, simple in structure and readily reducible to practical use.

These and other objects and advantages of the invention will be apparent upon reference to the following specification, attendant claims and drawings.

DETAILED DESCRIPTION OF THE PREFERRED EMBODIMENTS

Figure 1:
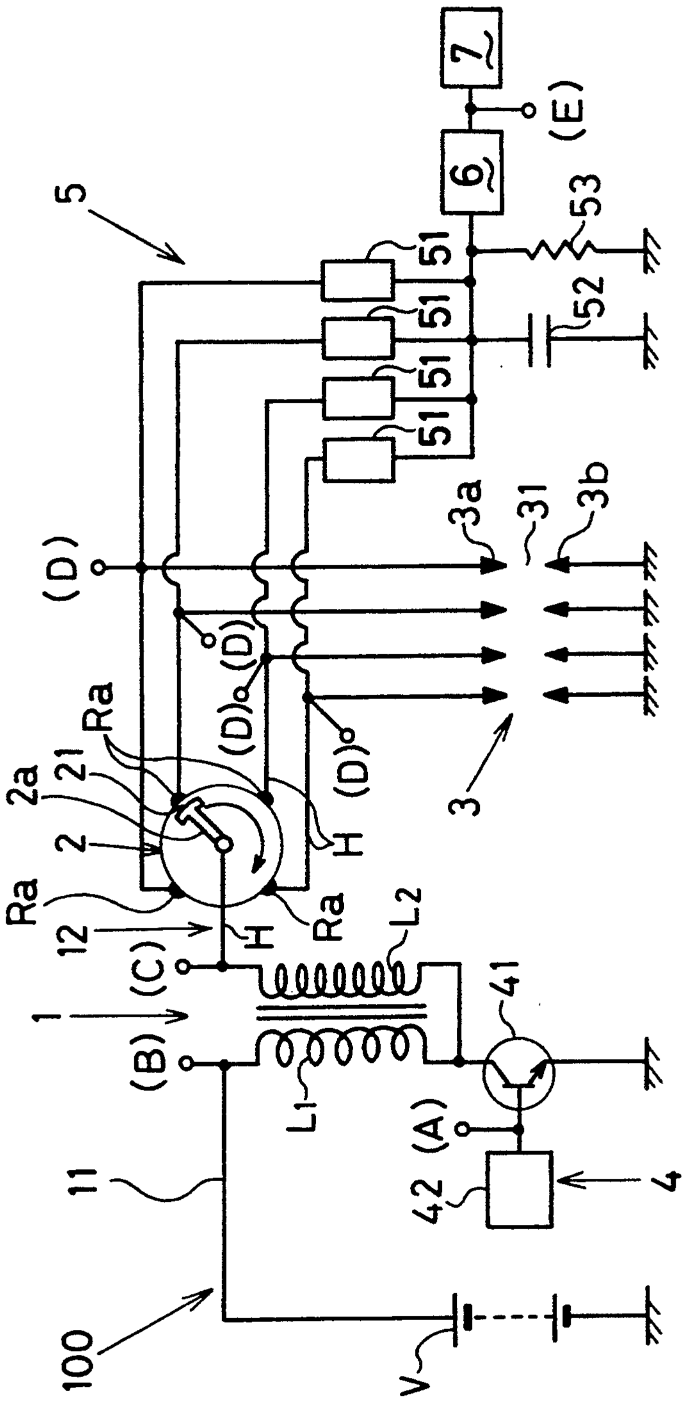
FIG. 1 is a schematic view of an ignition circuit in which an ignition detector is incorporated according to a first embodiment of the invention.

Referring to FIG. 1 which shows an ignition detector 100 which is incorporated into an internal combustion engine, the ignition detector 100 according to a first embodiment of the invention has an ignition circuit 1 which includes a primary circuit 11 and a secondary circuit 12, with a vehicular battery cell (V) as a power source. The primary circuit 11 has a primary coil (L1) electrically connected in series with a switching device 41 and a signal generator 42, while the secondary circuit 12 has a secondary coil (L2) connected to a rotor **2*a* of a distributor 2. The distributor 2 has stationary segments (Ra), the number of which corresponds to that of the cylinders of the internal combustion engine. To each of the stationary segments (Ra), is an free end of the rotor 2*a* adapted to approach each segment so as to make a rotor gap 21 (series gap) with the corresponding segments (Ra). Each of the segments (Ra) is connected to a spark plug 3 by way of a spark plug cable (H). The spark plug 3 has a center electrode 3*a* and an outer electrode 3*b* to form a spark gap 31 between the two electrodes 3*a*, 3*b***, across which a spark occurs when energized.

It is noted that a distributorless igniter, in which no distributor is provided, may be used. In this instance, a one way diode or air gap may be employed instead of the rotor gap 21 of the distributor 2.

The switching device 41 and the signal generator 42 form an interrupter circuit 4 which detects a crank angle and a throttling degree of the engine to interrupt the primary current flowing through the primary coil (L1) to induce a spark plug voltage in the secondary coil (L2) of the secondary circuit 12 so that the timing of the spark corresponds to an advancement angle relevant to a revolution and a load which the engine bears. The interrupter circuit 4 serves as a voltage charging circuit which on-off actuates the primary coil (L1) to induce a charging voltage in the secondary circuit 12 either during the establishing of the spark between the electrodes **3*a*, 3*b* or during a predetermined time period after an end of the spark, thus leading to electrically charging stray capacity inherent in the spark plug 3. In this instance, a discrete voltage charging circuit may be provided independently of the interrupter circuit 4**.

Figure 2:
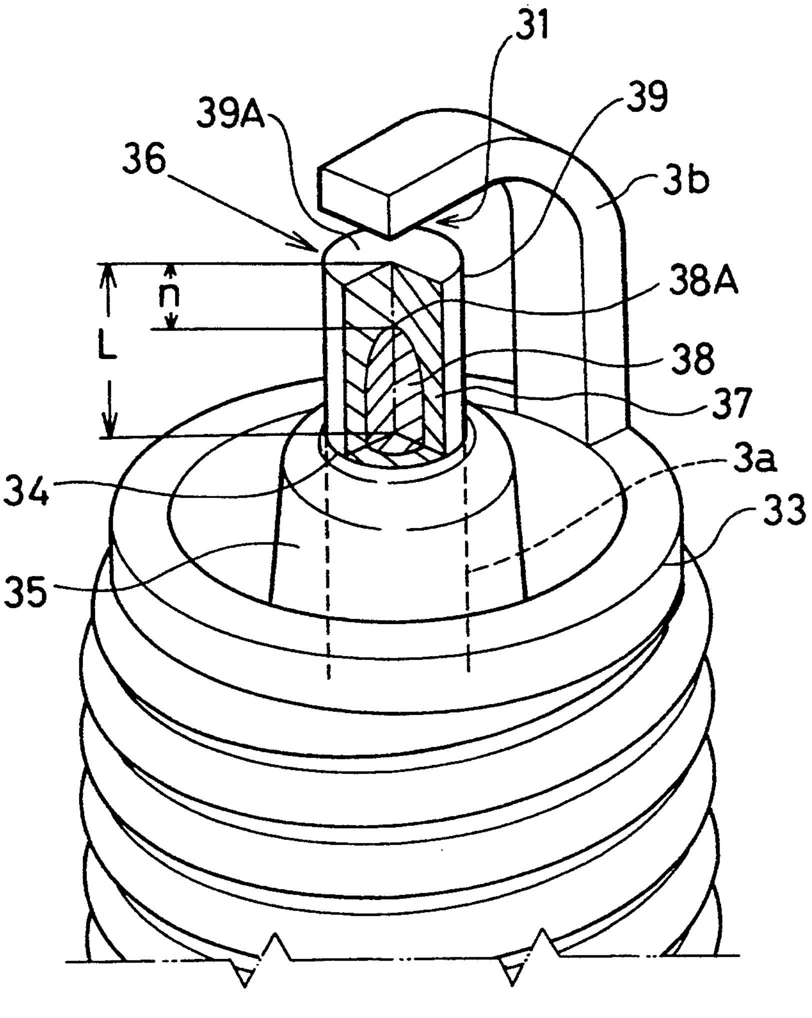
FIG. 2 is an enlarged perspective view of a main part of a spark plug.

As shown in FIG. 2, the spark plug 3 has a cylindrical metallic shell 33 to which the ground electrode **3*b* is welded. Within the metallic shell 33, an tubular insulator 35 is placed, an inner space of which serves as an axial bore 34. A middle axis 36 is connected to a lower end of the center electrode 3*a*, which is partly projected from a front end of the insulator 35. The middle axis 36 is of negative polarity, and having a nickel-alloyed clad 37 and a heat-conductor core 38 embedded in the clad 37. The clad 37 is made of pure nickel or a nickel alloy including 10–20 wt % Cr, while the heat-conductor core 38 is preferably made of pure copper, silver or 0.25 wt % aluminum containing copper alloy. As indicated by a projected portion 39, an outer surface area (exposed area) of the middle axis 36 projected from the insulator 35 is 25 $mm^2$ or more. A ratio of n/L is determined such that an outer surface area of the projected portion 39 residing between a front end surface 39A of the middle axis 36 and a front end 38A of the heat-conductor core 38 is less than half of the outer surface area of the projected portion 39. Where n=a length between the front end surface 39A of the middle axis 36 and the front end 38A of the heat-conductor core 38, and L=a length of the middle axis 36. Meanwhile, an electrical conductor (sensor) 51 surrounds an extension part of the spark plug cable (H) to define static capacity of e.g. 1 pF therebetween so as to form a voltage divider circuit 5. The conductor 51 is connected to ground by way of a condensor 52. To a common point between the conductor 51 and the condensor 52, is a spark plug voltage detector circuit 6 electrically connected to which a distinction circuit 7 is connected. The condensor 52 has a static capacity of e.g. 3000 pF to serve as a low impedance element, and the condensor 52 further has an electrical resistor 53 (e.g. 2 MΩ) connected in parallel therewith so as to form a discharge path for the condensor 52**.

Figure 3:
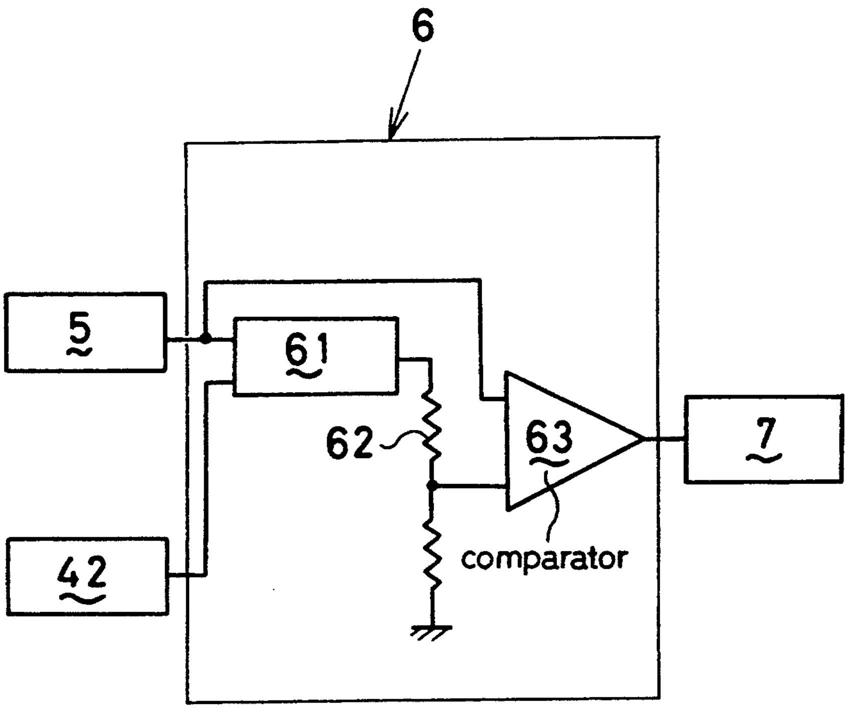
FIG. 3 is a view of a wiring diagram of a spark plug voltage detector circuit.

The voltage divider circuit 5 divides the spark plug voltage induced from the secondary circuit 12 by the order of 1/3000, which makes it possible to determine the RC time constant of the path to be approximately 9 milliseconds to render an attenuation time length of the spark plug voltage relatively longer (3 milliseconds) as described hereinafter. In this instance, the spark plug voltage 30,000 V divided to the level of 10 V is inputted to the spark plug voltage detector circuit 6. The spark plug voltage detector circuit 6 has a peak hold circuit 61, a voltage divider circuit 62 and a comparator 63 as shown in FIG. 3. The input signal (A) of the signal generator 42 and the divided voltage of the voltage divider circuit 5 are input to the peak hold circuit 61. The voltage divider circuit 62 divides an output voltage from the peak hold circuit 61. The comparator 63 compares the output from the voltage divider circuit 5 with the divided voltage from the voltage divider circuit 62 in order to detect a holding time length of an output voltage, the level of which is more than a predetermined level among the divided voltage waveform of the spark plug voltage. The distinction circuit 7 determines the misfire by detecting the holding time length longer than a certain period of time.

Figure 4:
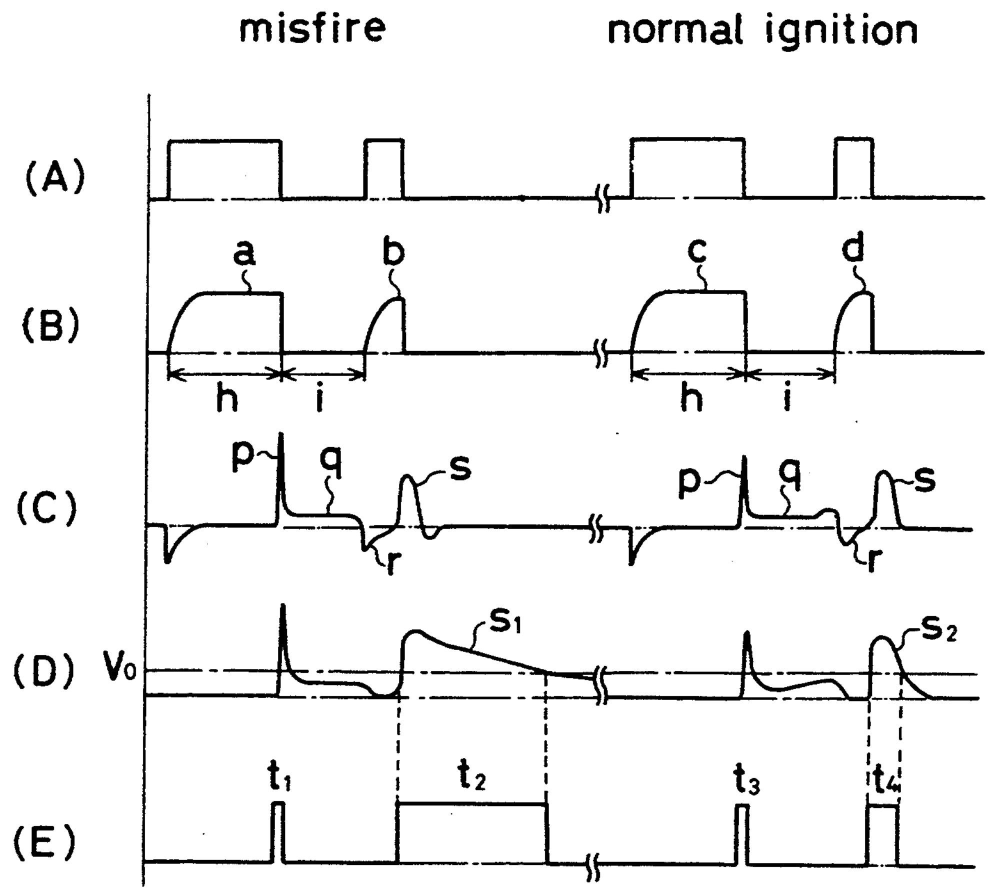
FIG. 4 is a view of a spark plug voltage waveform shown for the purpose of explaining how the spark plug voltage detector circuit works.

With the structure thus far described, the signal generator 42 of the interrupter circuit 4 outputs pulse signals as shown at (A) in FIG. 4 in order to induce the primary current in the primary circuit 11 as shown at (B) in FIG. 4. Among the pulse signals, the pulses (a), (c) which have a larger width (h) energize the spark plug 3 to establish the spark between the electrodes 3*a*, 3*b*. The pulses (a), (c) followed by the pulses (b), (d) delayed by a time of 0.5–1.5 ms (i). The pulses (b), (d) have a thin width to electrically charge the stray capacity inherent in the spark plug 3.

In so doing, the time length during which the free end of the rotor 2*a* forms the rotor gap 21 with each of the segments (Ra), changes depending on the revolution of the engine. The pulse width (h) and the delay time (i) are made shorter such that the spark holds for 0.5–0.7 ms when the engine is operating at a high revolution (6000 rpm).

With the actuation of the interrupter circuit 4, the spark plug voltage appears in the secondary coil (L2) of the secondary circuit 12 as shown at (C) in FIG. 4. Due to the high voltage (p) established following the termination of the pulse signals (a), (c), the spark begins to occur with an inductive discharge waveform (q) accompanied.

In response to the rising edge of pulse signals (b), (d), a counter-electromotive voltage accompanies a positive voltage waveform (r) flowing through the secondary circuit 12, thus making it possible to terminate the spark when the spark lingers. Due to electrical energy stored in the ignition circuit 1 when the primary coil (L1) is energized, the secondary voltage is enhanced again to generate a voltage waveform (s) in the secondary circuit when the primary coil (L1) is deenergized. The enhanced voltage level is determined as desired by the delay time (i) and the width of the pulse signals (b), (d). The level of the voltage waveform (s) is 5–7 kv, the magnitude of which is enough to break down the rotor gap 21, but not enough to establish a discharge between the electrodes 3*a*, 3*b* when the air-fuel mixture gas staying in the spark gap 31 is free from ionized particles.

The discharge voltage, due to the charge stored in the stray capacity (usually 10–20 pF) inherent in the spark plug 3, is released as shown at (D) in FIG. 4. The attenuation time length of the discharge voltage is distinguishable from the case which the spark normally ignites the air-fuel mixture gas to the case in which the spark fails to ignite the air-fuel mixture gas injected in each cylinder of the internal combustion engine. That is to say, the misfire exhibit a slowly attenuating waveform (s1) as shown in FIG. 4, while the normal combustion exhibits an abruptly attenuating waveform (s2) as shown in FIG. 4. The spark plug voltage detector circuit 6 detects a voltage waveform level of more than a reference voltage level (V) so as to deform the voltage waveform into square wave pulses t1–t4, each width of which is equivalent to the attenuation time length. The square wave pulses t1–t4 are input to the distinction circuit 7 so as to cause the circuit 7 to determine the misfire when the attenuation time length is more than 3 ms (1 ms) with the revolution of the engine at 1000 rpm (6000 rpm). The distinction circuit 7 further determines the misfire when the attenuation time length is more than the one decreasing in proportion to the engine revolution which falls between 1000 and 6000 rpm.

In the first embodiment of the invention, the rotor gap 21 of the distributor 2 is used as a series gap. In the distributorless ignitor, a check diode is provided in the secondary circuit to acts as the series gap. When a discrete voltage charging circuit is employed, a step-up coil may be used instead of the ignition circuit 1 to induce a voltage (4–5 kv) so as to energize the secondary circuit.

When the exposed area of the projected portion of the middle axis 36 is less than 25 $mm^2$, it is preferable that the spark plug voltage is maintained positive by reversely connecting the ignition circuit 1 since the ionized particles in the air-fuel gas mixture allow the electric current to flow better when the middle axis 36 is kept positive than otherwisely connected. When the center electrode 3*a* is maintained with a positive polarity, the anode ions are attracted to the ground electrode 3*b* so that the exchange speed of the ions is facilitated by the outer surface area ratio (approx. 10 times) of the ground electrode 3*b* to the center electrode 3*a*. The exchange speed of the ions is dominated by the speed of the cathode ions because the light-weight electrons quickly move toward the center electrode 3*a*.

Although the exchange speed of the ions is dominated by the speed of the cathode ions, it makes no substantial difference whether the middle axis 36 is maintained negative or positive when the outer surface area of the projected portion 39 exceeds 25 $mm^2$. When the middle axis 36 is maintained with a negative polarity, the cathode ions in the combustion flame are attracted to the middle axis 36 of the center electrode 3*a* to permit a current flow so as to observe the attenuation characteristics of the sparkplug voltage waveform. In this instance, the heavy cathode ions are less mobile than the electrons, and are considered to stay around the middle axis 36. Therefore, it is effecive to determine the outer surface area of the projected portion 39 to be 25 $mm^2$ or more when the middle axis 36 of the center electrode 3*a* is maintained with a negative polarity.

Figure 5:
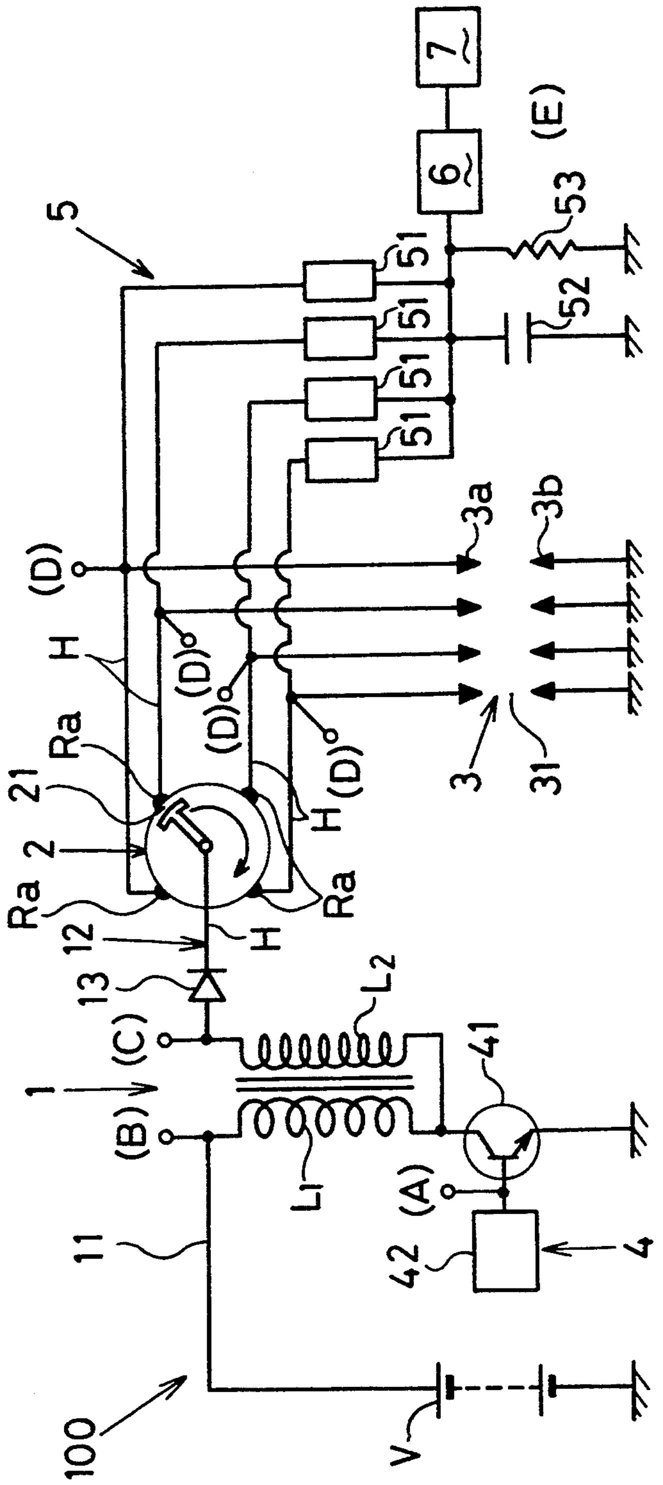
FIG. 5 is a view similar to FIG. 1 according to a second embodiment of the invention.
Figure 6:
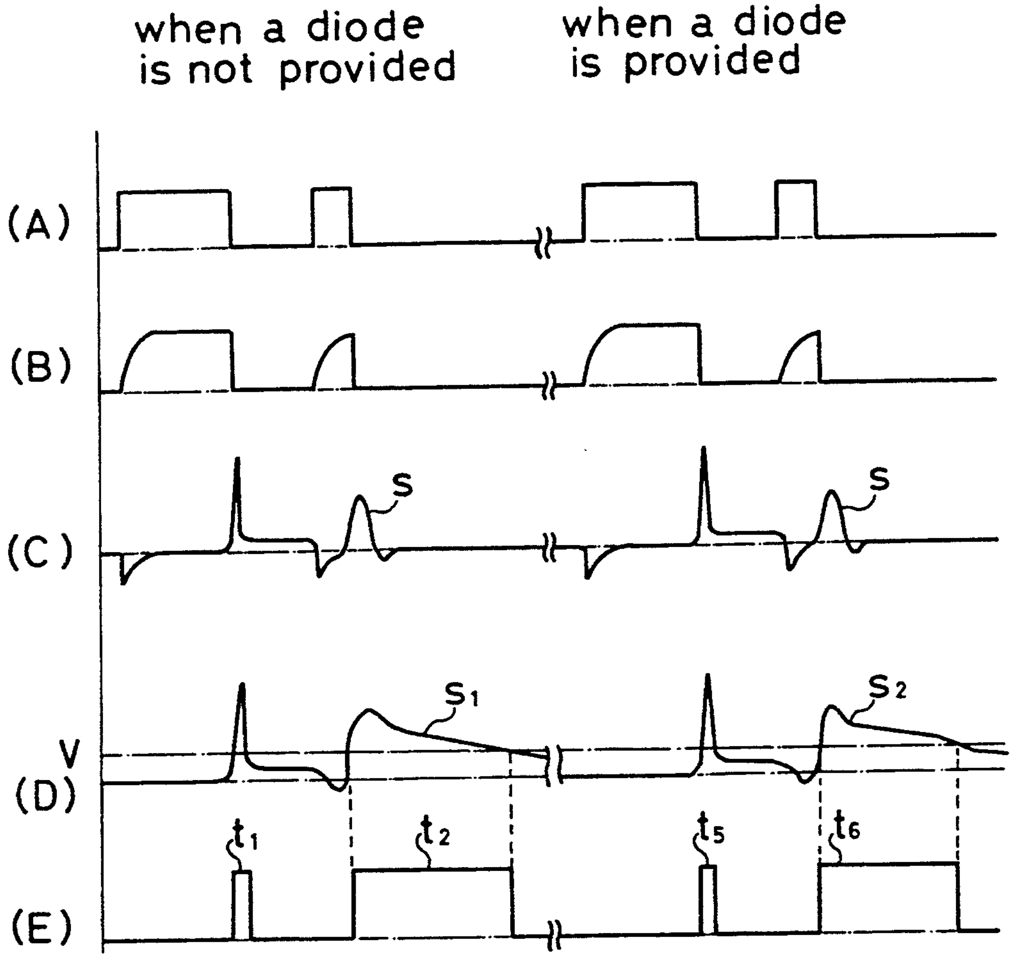
FIG. 6 is a schematic view of a spark plug voltage waveform shown for the purpose of explaining how the spark plug voltage detector circuit works according to the second embodiment of the invention.

FIGS. 5 and 6 show a second embodiment of the invention in which a check diode 13 is electrically connected between the rotor gap 21 of the distributor 2 and the secondary coil (L2) of the secondary circuit 12. The diode 13 allows electric current to flow from the secondary coil (L2) to the rotor gap 21 of the distributor 2, but prohibits the electric current to flow backward.

With the pulse signals (A), which induce the spark plug voltage in the secondary circuit 12, the spark plug voltage is enhanced again as mentioned herein before when deenergized. The enhanced voltage electrically charges the stray capacity inherent in the spark plug 3 to make a potential difference between the ignition circuit 1 and the spark plug 3.

In this instance, the check diode 13 prohibits the electric current to flow through the rotor gap 21 in the direction opposite to the spark which occurs from the center electrode 3*a* to the outer electrode 3*b*. Otherwise, the voltage waveform (s) shown in FIG. 6 reduces from 5–7 kv to 3–4 kv so as to deteriorate the precision on detecting the attenuation time length.

With the provision of the check diode 13, the spark plug voltage accompanies a slowly attenuating the voltage waveform (s3) as opposed to that accompanying the rapidly changing voltage waveform (s1) as shown in FIG. 6.

In the spark plug voltage detector circuit 6, the peak hold circuit 61 holds a peak voltage based on the stray capacity of the spark plug 3 with ⅓ of the peak voltage as the reference voltage (Vo) for example. The comparator 63 compares the reference voltage (Vo) with the output voltage waveform from the voltage divider circuit 5 so as to output square pulses t5, t6 as shown at (E) in FIG. 6. The square pulses t5, t6 are inputted to the distinction circuit 7 to determine whether the misfire occurs or not in the cylinder of the internal combustion engine.

Figure 7:
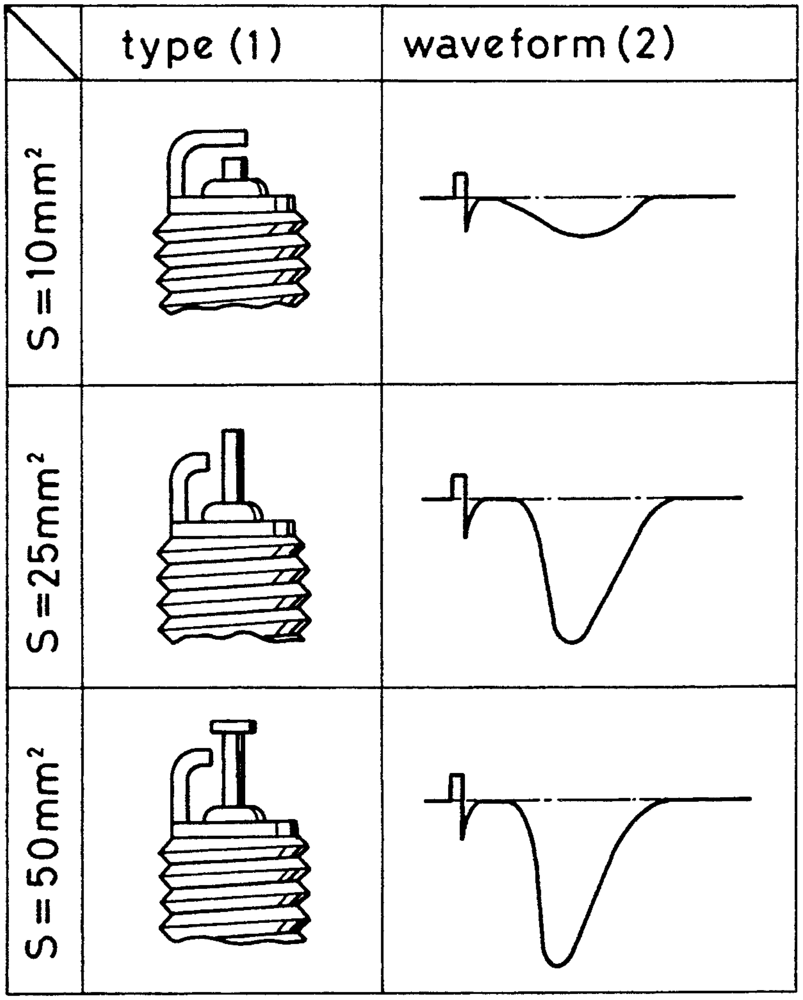
FIG. 7 is a graph showing a relationship between an exposed area of a middle axis and an ion current waveform.

FIG. 7 shows a relationship between the exposed area (S) of the projected portion 39 and the ion current waveform derived immediately after the end of the spark action. The relationship is obtained by carrying out the experiment test with the spark plugs mounted on a 2000 cc, four-cylinder, four-cycle engine. The three types of the spark plugs have exposed areas (S) of 10 $mm^2$, 25 $mm^2$ and 50 $mm^2$. The results teach that the ion current increases with the enlargement of the exposed area (S) of the projected portion 39, and thus distinguishing the noise to clarify the peak of the voltage waveform so as to easily detect the ion current.

Figure 8:
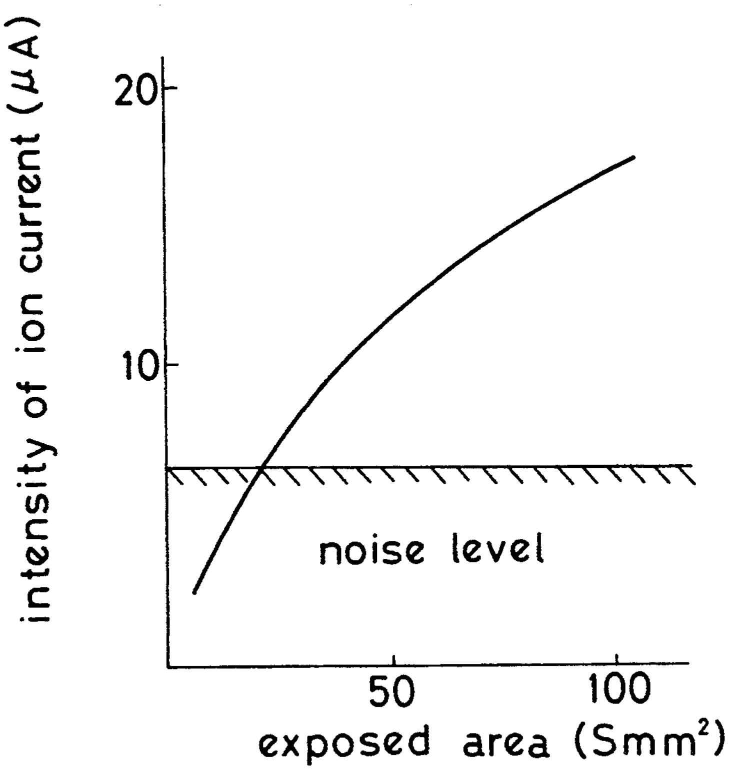
FIG. 8 is a graph showing a relationship between the exposed area of a middle axis and an ion current level.

FIG. 8 shows a relationship between the exposed area (S) of the projected portion 39 and the mean peak level of the ion current waveform derived immediately after the end of the spark action. When the exposed area (S) exceeds 25 $mm^2$ ($S > 25$ $mm^2$), the intensity of the ion current exceeds 8 μA. Considering that the noise level of the ion current detecting circuit is several μA, the ion current is precisely detected when the exposed area (S) exceeds 25 $mm^2$.

Figure 9:
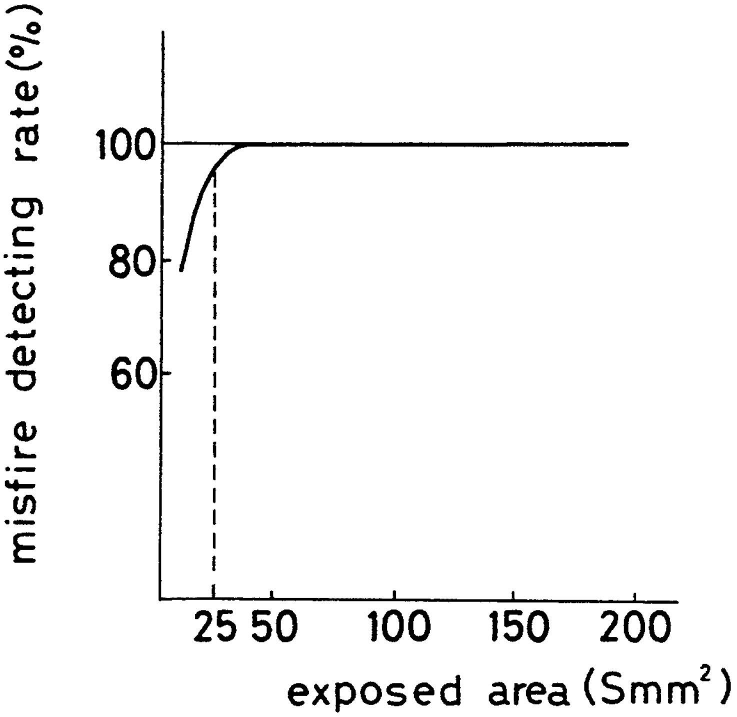
FIG. 9 is a graph showing a relationship between the exposed area of a middle axis and a misfire detection precision.

FIG. 9 shows a relationship between the exposed area (S) of the projected portion 39 in FIG. 2 and the misfire detecting rate. The results indicates that when the exposed area (S) is less than 25 $mm^2$ ($S < 25$ $mm^2$), the peak level of the ion current is too low to distinguish the noise so that the misfire detecting rate quickly deteriorates.

Figure 10:
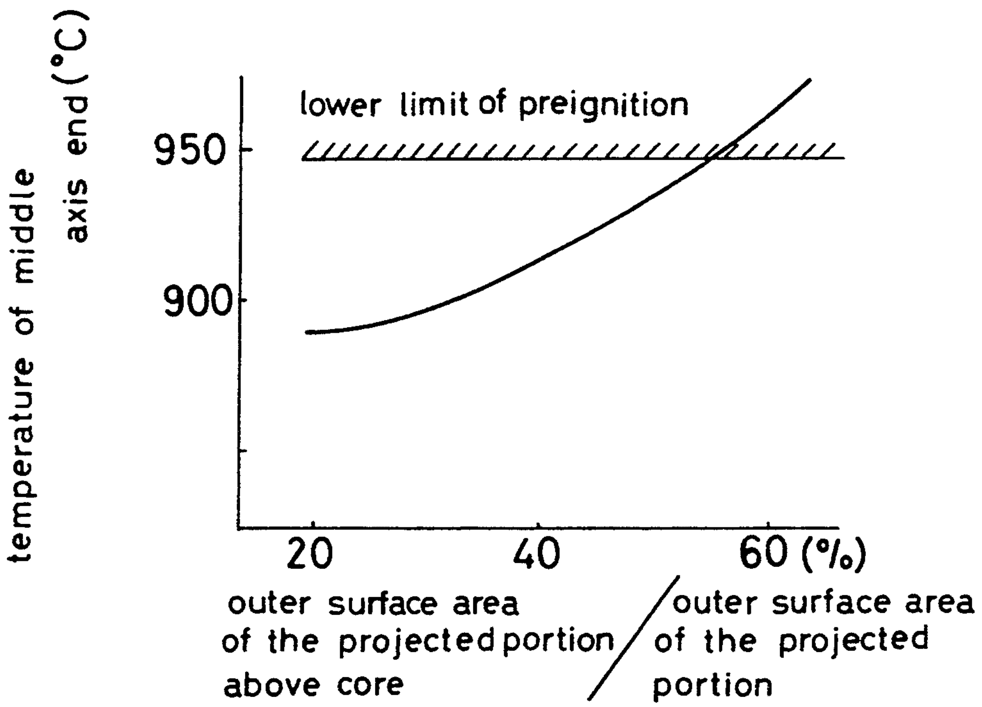
FIG. 10 is a graph showing a relationship between the exposed area of a middle axis and the temperature of the middle axis.

FIG. 10 shows temperature measurement results of the projected portion 39 of the middle axis with the spark plug mounted on the engine which ran at 3000 rpm at full throttle. Regarding the ratio of n/L, the results indicate that the temperature of the front end of the middle axis 36 excessively rises to cause the preignition when the outer surface area of the projected portion 39 above the heat-conductor core 38 exceeds the half of the outer surface area of the projected portion 39.

Figure 11:
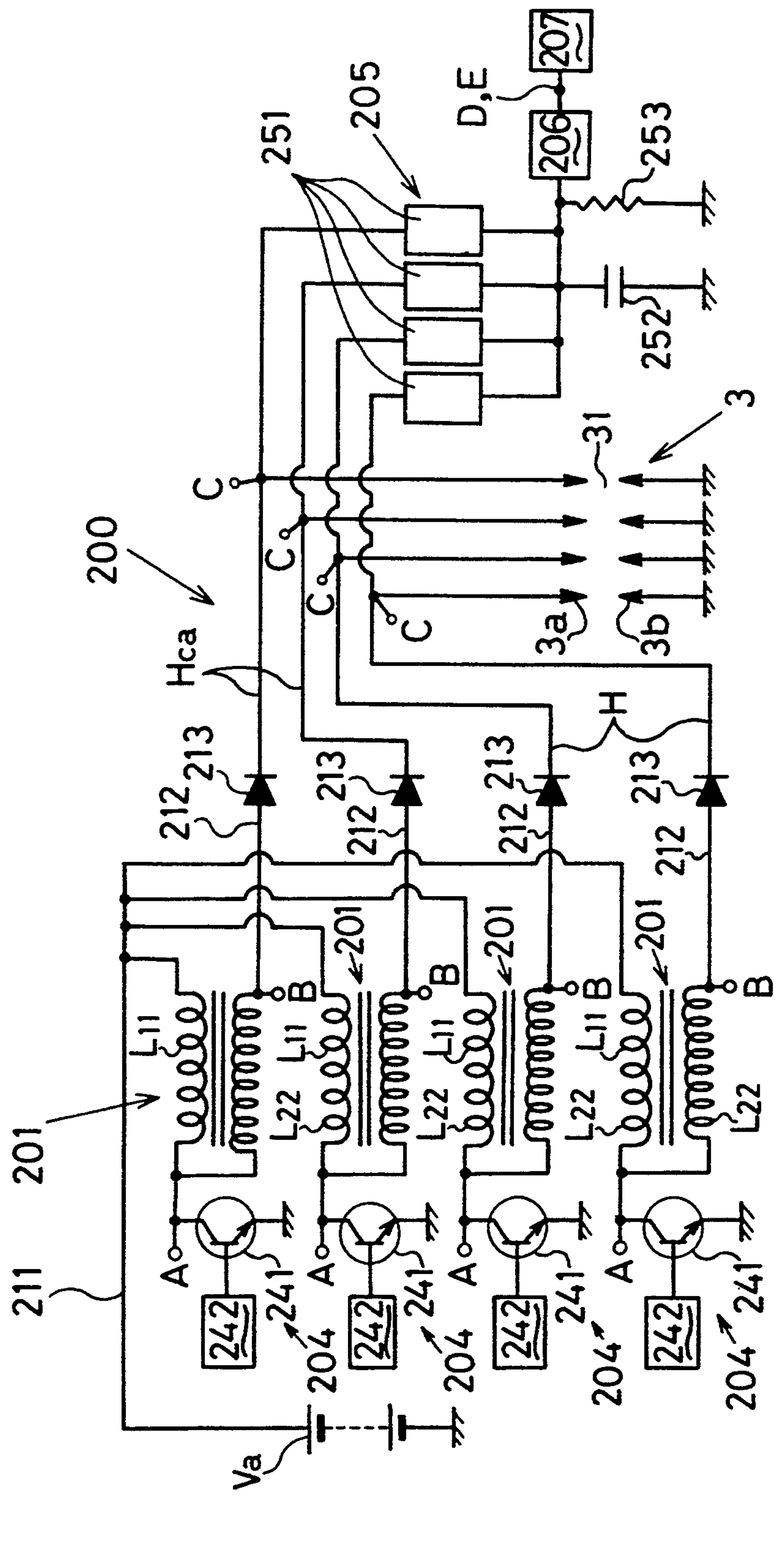
FIG. 11 is a schematic view of an ignition circuit in which an ignition detector is incorporated according to a third embodiment of the invention.

Referring to FIG. 11 which shows a distributorless type of an ignition detector 200 in which no distributor is needed, and incorporated into an internal combustion engine according to a third embodiment of the invention, the ignition detector 200 has an ignition circuit 201 which includes a primary circuit 211 and a secondary circuit 212 with a vehicular battery cell (Va) as a power source. The number of the ignition circuits 201 provided in the third embodiment correspond to the number of cylinders in the internal combustion engine.

The primary circuit 211 has a primary coil (L11) electrically connected in series with a switching device 241 and a signal generator 242, while the secondary circuit 212 has a secondary coil (L22) and a check diode 213 connected in series with each other. A spark plug cable (Hca) connects the diode 213 to the spark plug 3 installed in each cylinder of the internal combustion engine. The spark plug 3 has the center electrode 3*a* and an outer electrode 3*b* to form a spark gap 31 between the two electrodes 3*a*, 3*b*, across which a spark occurs when energized. The spark plug 3 has the same structure, and the center electrode 3*a* has a negative polarity as described in the first embodiment of the invention (see FIG. 2).

The switching device 241 and the signal generator 242 form an interrupter circuit 204 which detects a crank angle and a throttling degree of the engine to interrupt the primary current flowing through the primary coil (L11) to induce a spark plug voltage in the secondary coil (L22) of the secondary circuit 212 so that the timing of the spark corresponds to an advancement angle relevant to a revolution and load which the engine bears.

Meanwhile, an electrical conductor 251 surrounds an extension line of the spark plug cable (Hca) to define static capacity of e.g. 1 pF therebetween so as to form a voltage divider circuit 205. The conductor 251 is connected to the ground by way of a condensor 252. To a common point between the conductor 251 and the condensor 252, is a spark plug voltage detector circuit 206 electrically connected to which a distinction circuit 207 is connected. The condenser 252 has static capacity of 3000 pF to serve as a low impedance element, and the condensor 252 further has an electrical resistor 253 (3 MΩ) connected in parallel therewith so as to form a discharge path for the condensor 252.

The voltage divider circuit 205 divides the spark plug voltage induced from the secondary circuit 212 by the order of 1/3000, which makes it possible to determine the time constant of RC path to be approximately 9 milliseconds to render an attenuation time length relatively longer (2–3 milliseconds) as described hereinafter.

Figure 12:
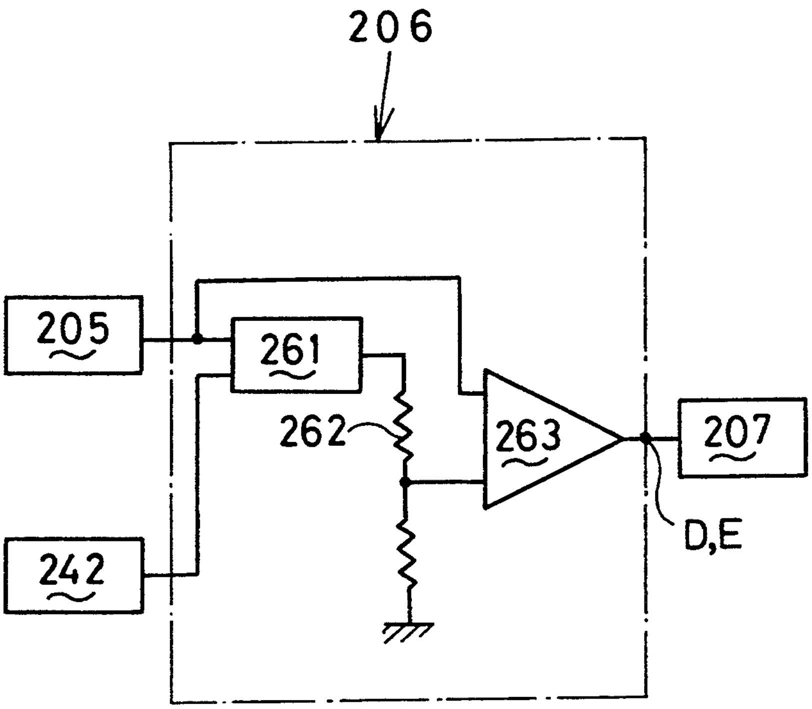
FIG. 12 shows a wiring diagram of a spark plug voltage detector circuit according to the third embodiment of the invention.

In this instance, the spark plug voltage 30,000 V divided to a level of 10 V is input to the spark plug voltage detector circuit 206. As shown in FIG. 12, the spark plug voltage detector circuit 206 has a peak hold circuit 261 which is adapted to be reset at the time determined by the signal generator 242 in order to hold an output voltage generated from the voltage divider circuit 205. The spark voltage detector circuit 206 further has a divider circuit 262 which divides an output from the peak hold circuit 261, and having a comparator 263 which generates pulse signals by comparing an output from the divider circuit 262 with that of the voltage divider circuit 205.

A microcomputer is incorporated into the distinction circuit 207 which compares output pulse signals with data previously determined by calculation and experiment so as to determine whether or not misfire occurs in the cylinder of the internal combustion engine.

Figure 13:
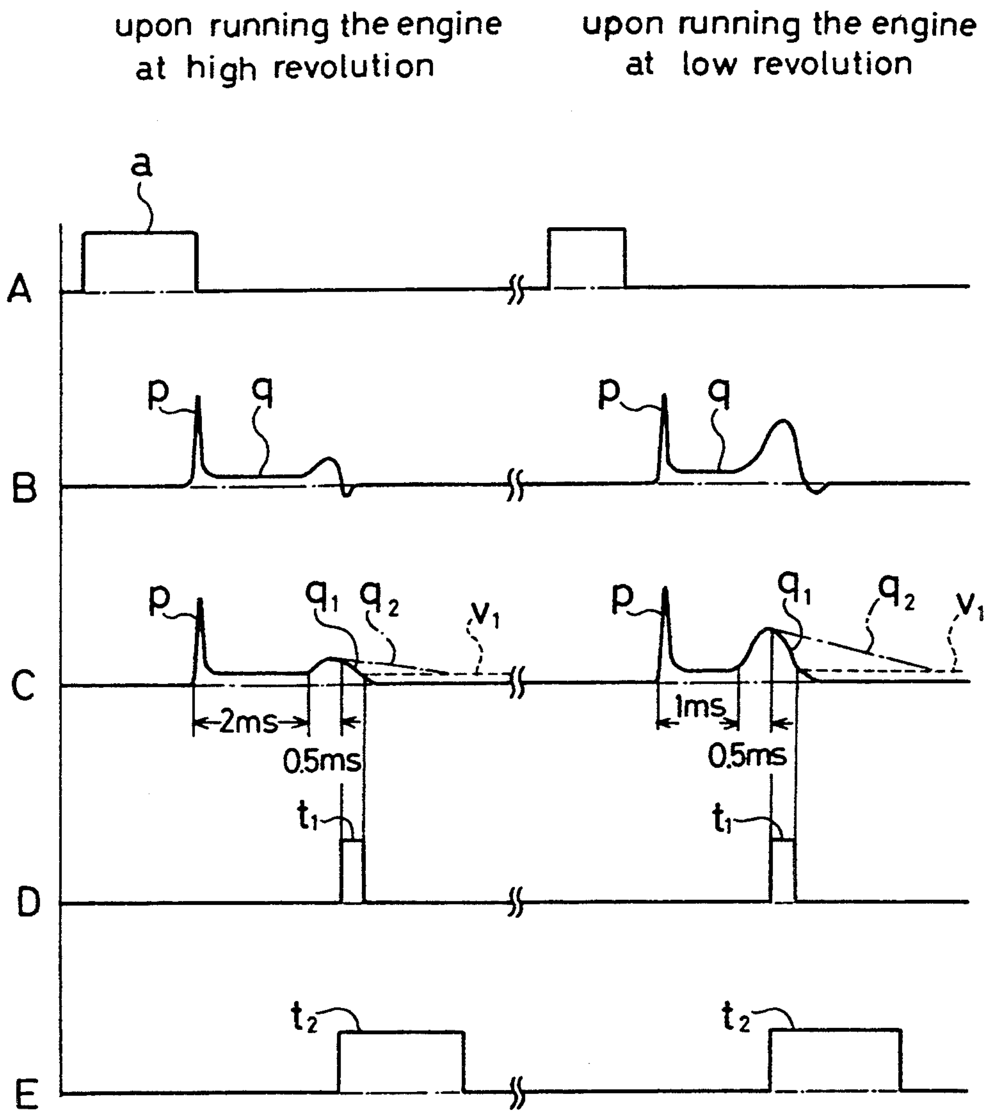
FIG. 13 is a view of a spark plug voltage waveform shown for the purpose of explaining how the spark plug voltage detector circuit works according to the third embodiment of the invention.

With the structure thus far described, the signal generator 242 on-off actuates the switching device 241 to output pulse signals (a) as shown at (A) in FIG. 13 in order to induce a secondary voltage in the secondary coil L22 as shown at (B) in FIG. 13 in which a termination of the pulse signals (a) accompanies a high voltage waveform (p) to initiate the spark occurring across the electrodes 3*a*, 3*b*, and accompanying a low inductive discharge (q) following the high voltage waveform (p).

Upon running the engine at a low revolution, the low inductive discharge (q) which forms a spark plug voltage waveform sustains for approximately 2 ms, and disappears with an exhaustion of an electrical energy stored in the ignition circuit 201. The exhaustion of the electrical energy culminates the spark plug voltage in 2–3 kv. Upon running the engine at a high revolution, the low inductive discharge (q) which forms the spark plug voltage waveform sustains for approximately 1 ms, and disappears with the exhaustion of the electrical energy stored in the ignition circuit 201. The exhaustion of the electrical energy culminates the spark plug voltage in 5–8 kv.

A spark plug voltage waveform between the diode 213 and the spark plug 3 is derived mainly from the discharge of the stray capacity (usually 10–20 pF) inherent in the spark plug 3 after the spark terminates. An attenuation time length of the spark plug voltage waveform differs between the case in which the spark normally ignites the air-fuel mixture gas and the case in which the spark fails to ignite the air-fuel mixture gas.

That is, the discharge from the stray capacity is released through ionized particles of the combustion gas upon carrying out the normal combustion, so that the spark plug voltage waveform rapidly attenuates as shown at solid lines (q1) of (C) in FIG. 13. The misfire makes the unburned gas free from the ionized particles, so that the discharge from the stray capacity leaks mainly through the spark plug 3. The spark plug voltage waveform slowly attenuates as shown at phantom lines (q2) of (C) in FIG. 13.

In the meanwhile, an average value of the spark sustaining time length is determined according to operating conditions obtained from calculation and experiment based on the revolution, the workload of the engine and the design of the ignition system. The signal generator 242 is adapted to carry out the reset and peak hold timing of the peak hold circuit 61 by approximately 0.5 ms later following the expiration of the average value of the spark sustaining time length.

The peak hold circuit 261 holds a charged voltage of the stray capacity inherent in the spark plug 3, while the divider circuit 262 divides the charged voltage. With ⅓ of the charged voltage as a reference voltage (v1), the comparator 263 compares the reference voltage (v1) with the output voltage waveform from the voltage divider circuit 205. The comparator 263 generates a shorter pulse (t1) as shown (D) in FIG. 13 when the spark normally ignites the air-fuel mixture gas, while generating a wider pulse (t2) as shown (E) in FIG. 13 when the misfire occurs.

The pulses (t1), (t2) are fed into the distinction circuit 207 so as to cause the circuit 207 to determine the misfire when the attenuation time length exceeds 3 ms upon running the engine at the low revolution (1000 rpm), while determining the misfire when the attenuation time length exceeds 1 ms upon running the engine at the high revolution (6000 rpm). The distinction circuit 207 further determines the misfire when the attenuation time length exceeds the one decreasing in proportion to the engine revolution which falls within an intermediate speed range between 1000 rpm and 6000 rpm.

Figure 14:
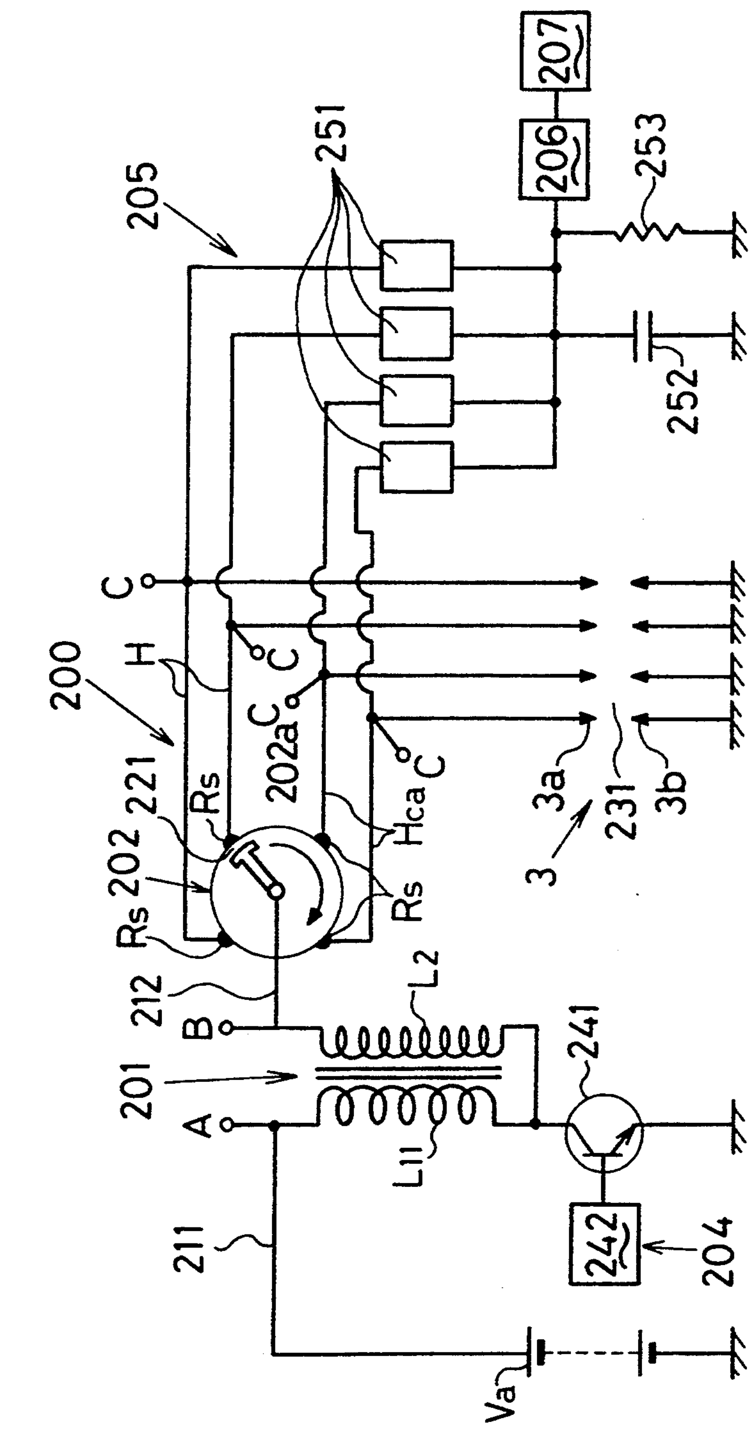
FIG. 14 is a view similar to FIG. 11 according to a fourth embodiment of the invention.

FIG. 14 shows a fourth embodiment of the invention in which like reference numerals in FIG. 14 are identical to those in FIG. 11. A main portion in which the fourth embodiment differs from the third embodiment is that a distributor 202 is provided according to the fourth embodiment of the invention.

In the fourth embodiment of the invention in which only a single ignition circuit is necessary as designated at numeral 201 as the same manner in FIG. 11, the secondary coil (L22) of the secondary circuit 212 is connected directly to a rotor 202*a* of the distributor 202. The distributor 202 has stationary segments (Rs), the number of which corresponds to that of the cylinders of the internal combustion engine. To each of the stationary segments (Rs), a free end of the rotor 202*a* adapted so as to make a rotor gap 221 (series gap) with the corresponding segments (Rs). Each of the segments (Rs) is connected to the spark plug 3 by way of the spark plug cable (Hca). The spark plug 3 has a center electrode 3*a* and an outer electrode 3*b* to form a spark gap 231 between the two electrodes 3*a*, 3*b*, across which a spark occurs when energized. The spark plug 3 has the same structure, and the center electrode 3*a* has a negative polarity as described at the first embodiment of the invention shown in FIG. 2.

The interrupter circuit 204 which is formed by the switching device 241 and the signal generator 242 serves as a voltage charging circuit according to the fourth embodiment of the invention.

Upon running the engine at a relatively low revolution of less than 3000 rpm, the enhanced level of the spark plug voltage is such a degree as to limit the voltage level charged in the stray capacity of the spark plug 3 by way of the series gap 221 after the spark terminates, thus rendering it impossible to precisely determine the attenuation characterics of the spark plug voltage. In this instance, it is advantageous to independently induce an increased level of the secondary voltage based on the voltage charging circuit.

The voltage charging circuit is adapted to selectively on-off actuate the primary coil (L11) so as to induce a charging voltage in the secondary circuit 12 either during the establishing of the spark between the electrodes 3*a*, 3*b* or during a predetermined time period immediately after an end of the spark, thus leading to electrically charging the stray capacity inherent in the spark plug 3.

The voltage charging circuit is actuated only upon running the engine at a relatively low revolution of less than 3000 rpm. Upon running the engine at the high revolution exceeding 3000 rpm, it is needless to activate the voltage charging circuit since the secondary voltage is excited to reach 5–8 kv enough to positively break down the series gap 221. A range which the voltage charging circuit is actuated is appropriately determined depending on a type of the internal combustion engine, and adjusted by operating conditions such as the load of the engine, temperature of cooling water and the vehicular battery cell (Va).

Figure 15:
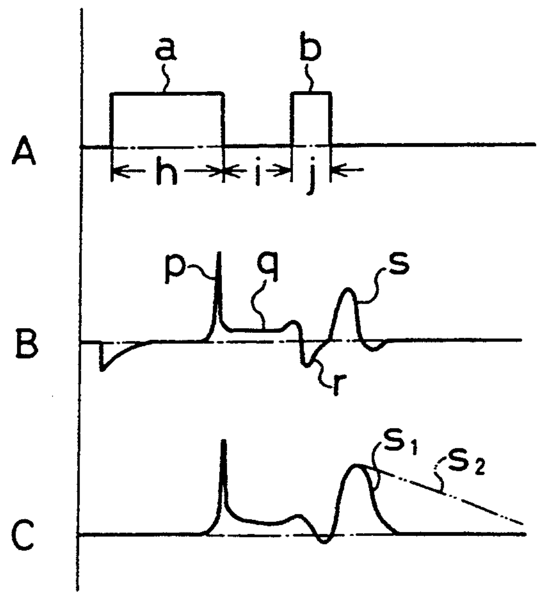
FIG. 15 is a schematic view of a spark plug voltage waveform shown for the purpose of explaining how the spark plug voltage detector circuit works according to the fourth embodiment of the invention.

The ignition detector 200 is operated in the same manner as described in the third embodiment of the invention, upon running the engine at the high revolution exceeding 3000 rpm. Upon running the engine at the relatively low revolution of less than 3000 rpm, the ignition detector 200 is operated as follows:

The signal generator 242 of the interrupter circuit 204 outputs pulse signals in order to induce the primary current in the primary circuit 211 as shown at (A) in FIG. 15. Among the pulse signals, the pulse (a) which has the larger width (h) energizes the spark plug 3 to establish the spark between the electrodes 3*a*, 3*b*.

The pulse (a) followed by the pulses (b) delays by the time (i) of 1.5–2.5 ms. The pulse (b) has a small width (j) to electrically charge the stray capacity inherent in the spark plug 3.

In so doing, the time length during which the free end of the rotor 202*a* forms the rotor gap 221 with each of the segments (Rs), changes depending on the revolution of the engine. The pulse width (h) and the delay time (i) are preferably determined relatively shorter (1.5 ms) in a manner that the spark sustains for 0.5–0.7 ms when the engine is running within a range of the intermediate revolution.

With the actuation of the interruter circuit 204, the spark plug voltage appears in the secondary coil (L22) of the secondary circuit 212 as shown at (C) in FIG. 15. Due to the high voltage (p) established following the termination of the pulse signal (a), the spark discharge begins to occur across the electrodes 3*a*, 3*b*, and accompanying an inductive discharge waveform (q) until the spark terminates.

In response to the rise-up pulse signal (b), a counter-electromotive voltage accompanies a positive voltage waveform (r) flowing through the secondary circuit 212. Due to electrical energy stored in the ignition circuit 201 when the primary coil (L11) is energized, the spark plug voltage is enhanced again to draw a voltage (s) through the secondary circuit 212 when the primary coil (L11) is deenergized. The enhanced voltage level is determined as desired by the delay time (i) and the width (j) of the pulse signal (b). The level of the voltage waveform (s) is determined to be 5–7 kv, the intensity of which is enough to break down the rotor gap 221, but not enough to establish a discharge across the electrodes 3*a*, 3*b* when substantially no ionized particles stay in the spark gap 31.

The discharge voltage mainly from the stray capacity (usually 10–20 pF) inherent in the spark plug 3, is released as shown at (C) in FIG. 15. The attenuation time length of the discharge voltage distinguishes the case in which the spark normally ignites the air-fuel mixture gas from the case in which the spark fails to ignite the air-fuel mixture gas injected in each cylinder of the internal combustion engine. That is to say, the misfire follows a slowly attenuating waveform (s2) of (C) as shown in FIG. 15, while the normal combustion follows an abruptly attenuating waveform (s1) of (C) as shown in FIG. 15.

Whether or not the misfire occurs is determined by detecting the attenuation time length required for the peak voltage level to drop as described at the third embodiment of the invention shown in FIG. 12.

It is noted that a check diode may be electrically connected between the rotor 202*a* of the distributor 202 and the secondary coil (L22) of the secondary circuit 212. The check diode allows electric current to flow from the secondary coil (L22) to the rotor 202*a* of the distributor 202, but prohibits the electric current to flow backward. The check diode prevents an excessively charged voltage 5–7 kv from inadvertently flowing backward to the ignition circuit 201 by way of the series gap 221. This avoids an abrupt rise-up voltage in the ignition circuit so as to contribute to a precise misfire detection.

The misfire is thus far detected on the basis of the attenuation time length by holding the spark plug voltage at the predetermined time, it is however noted that the misfire may be determined by detecting the spark plug voltage level changed after the elapse of the predetermined time.

Figure 16:
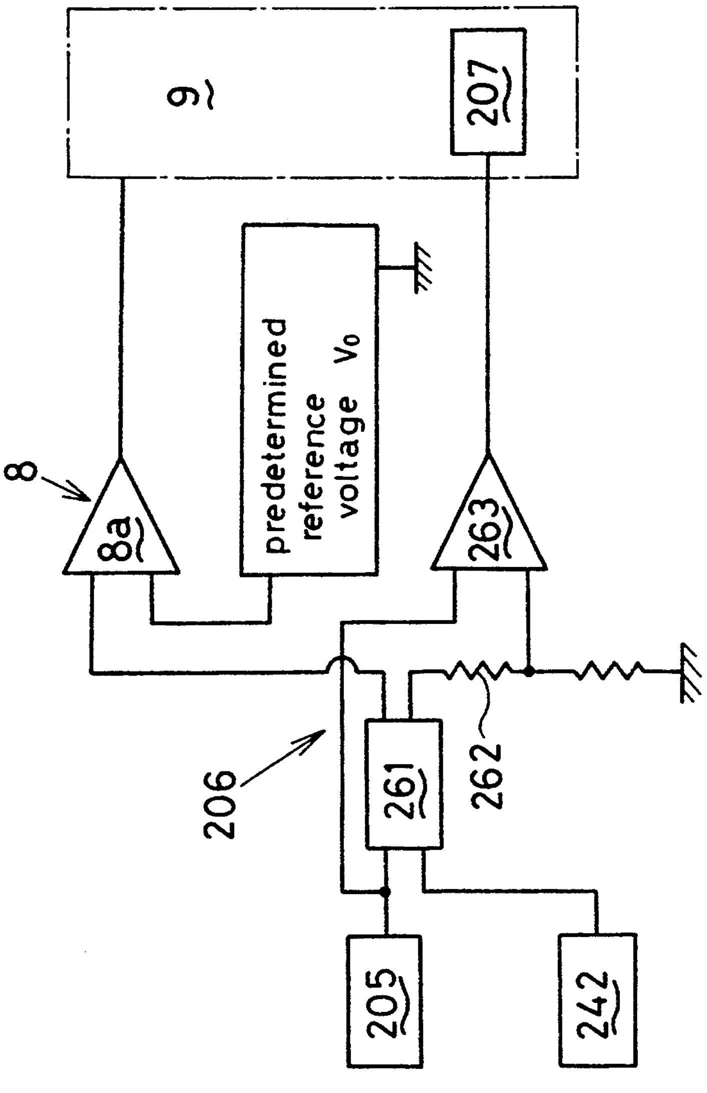
FIG. 16 shows a wiring diagram of a spark plug voltage detector circuit according to the fifth embodiment of the invention.

FIG. 16 shows a fifth embodiment of the invention in which like reference numerals in FIG. 16 are identical to those in FIG. 12. Numeral 8 designates a step-up level detector circuit which detects a stepped-up level of the spark plug voltage after the end of the spark action. The step-up level detector circuit 8 has a comparator 8*a* to compare a predetermined reference voltage (Vo) with a peak voltage value held by the peak hold circuit 261 so as to generate output pulses. The output pulses are fed into an auxiliary distinction circuit 9 which determines the misfire depending on the level of the output pulses.

Figure 17:
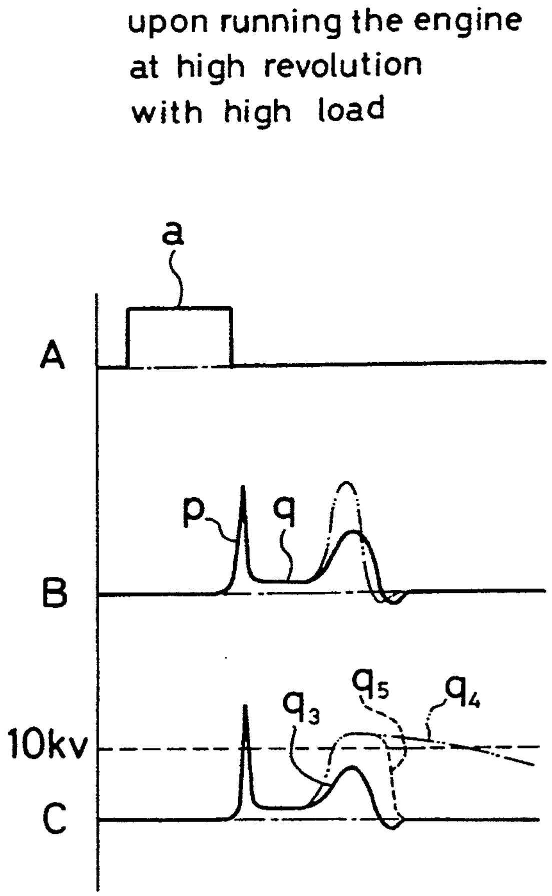
FIG. 17 is a view of a voltage waveform shown for the purpose of explaining how the spark plug voltage detector circuit works according to the fifth embodiment of the invention.

FIG. 17 shows a waveform of the spark plug voltage upon running the engine at full revolution (5000 rpm) with a high load. An enhanced voltage level of the spark plug voltage is only 3–5 kv as shown at (q3) of (C) in FIG. 17 when the spark normally ignites the air-fuel mixture gas. The spark plug voltage may rise to 10 kv or more as shown at (q4) of (C) in FIG. 17 when the spark fails to ignite the air-fuel mixture gas. The subsequent spark causes an abrupt descent of the rise-up spark plug voltage as shown at (q5) of (C) in FIG. 17. The abruptly descended waveform (q5) makes it difficult to distinguish the attenuation characteristics of the normal combustion from that of the misfire.

As opposed against this instance, it is possible to positively distinguish the normal combustion from the misfire upon running the engine at the high revolution by directly detecting the enhanced level of the spark plug voltage to decide whether or not the enhanced level exceeds the predetermined reference voltage (Vo: about 10 kv).

According to the third through fifth embodiments of the invention, the same results are obtained as represented by FIGS. 7 through 10 of the first and second embodiments of the invention.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

1. A misfire detector device for use in internal combustion engine comprising:

an ignition coil including a primary coil and a secondary coil;

an electrical interrupter circuit which on-off actuates a primary current flowing through a primary circuit of the ignition coil to induce a spark plug voltage;

a series gap or a check diode provided in a secondary circuit of the ignition coil so as to prevent a current flowing back to the ignition coil;

a spark plug which is to be energized from the ignition coil, the spark plug having a center electrode, a front end of which is projected from an insulator, and an outer surface area of the projected front end of the center electrode being 25 $mm^2$ or more;

a voltage charging circuit which re-energizes the primary coil to induce a second electromotive voltage in the secondary coil so as to electrically charge a stray capacity inherent in the spark plug at a predetermined time after the end of the spark action of the spark plug;

a voltage divider circuit which detects a divided voltage level of the spark plug voltage applied across electrodes of the spark plug;

a spark plug voltage detector circuit which detects an attenuation time period length of attenuation characteristics of a spark plug voltage waveform, produced by the second electromotive voltage, and which is presented from the voltage divider circuit subsequent to a predetermined time period after an end of a spark action of the spark plug; and a distinction circuit which determines on the basis of the attenuation time period length of the attenuation characteristics whether or not the spark ignites an air-fuel mixture injected in a cylinder of an internal combustion engine.

2. A misfire detector device for use in internal combustion engine comprising:

an ignition coil including a primary coil and a secondary coil;

an electrical interrupter circuit which on-off actuates a primary current flowing through a primary circuit of the ignition coil to induce a spark plug voltage;

a check diode or a series gap provided in a secondary circuit of the ignition coil so as to prevent a current flowing back to the ignition coil;

a spark plug which is to be energized from the ignition coil, the spark plug having a center electrode, a front end of which is projected from an insulator, and an outer surface area of the projected front end of the center electrode being 25 $mm^2$ or more;

a voltage divider circuit which detects a divided voltage level of the spark plug voltage applied across electrodes of the spark plug;

a spark plug voltage detector circuit which detects attenuation time period length of attenuation characteristics of a spark plug voltage waveform, from the voltage divider circuit presented subsequent to a predetermined time period after an end of a spark action of the spark plug; and a distinction circuit which determines on the basis of the attenuation time period length of the attenuation characteristics whether or not the spark ignites an air-fuel mixture injected in a cylinder of an internal combustion engine.

3. A misfire detector device for use in internal combustion engine comprising:

an ignition coil;

an interrupter circuit which on-off actuates a primary current flowing through a primary circuit of the ignition coil to induce a spark plug voltage;

a spark plug which is to be energized from the ignition coil, the spark plug having a center electrode, a front end of which is projected from an insulator, and an outer surface area of the projected front end of the center electrode being 25 $mm^2$ or more;

a voltage charging circuit which induces an electromotive voltage in the secondary circuit of the ignition coil by energizing the primary circuit, and deenergizing it after a certain period of time at a predetermined time after an end of a spark action due to an inductive discharge of the spark plug and before a next spark plug voltage is induced that causes a spark action, when the engine runs at a low revolution with a low load;

a voltage divider circuit which detects a divided voltage level of the spark plug voltage applied across electrodes of the spark plug;

a spark plug voltage detector circuit which detects attenuation characteristics of a spark plug voltage waveform presented from the voltage divider circuit subsequent to a predetermined time period after an end of a first spark action and either during a second spark action of the spark plug or after an end of the first spark action when the engine runs at a high revolution, and detecting attenuation characteristics of a spark plug voltage waveform derived from the voltage charging circuit when the engine runs at a low revolution with a low load; and a distinction circuit which determines on the basis of the attenuation characteristics whether or not the spark ignites an air-fuel mixture injected in a cylinder of an internal combustion engine.

4. A misfire detector device for use in internal combustion engine as recited in claim 1, 2 or 3, wherein a peak hold circuit is provided to hold a peak voltage of the spark plug voltage waveform presented after the end of the spark action of the spark plug, so that the distinction circuit detects a misfire on the basis of a peak voltage level or the attenuation characteristics of the spark plug voltage waveform.

5. A misfire detector device for use in internal combustion engine as recited in claim 1, 2 or 3, wherein the center electrode has a middle axis including a nickel-alloyed clad and a heat-conductor core embedded in the clad, and a ratio of n/L is determined such that an outer surface area of a projected portion of the middle axis residing between a front end surface of the middle axis and a front end of the heat-conductor core is less than half of the outer surface area of the projected portion of the middle axis projected from an insulator, where L=the length of the middle axis projected from a front end of the insulator, and n=a distance between the front end of the heat-conductor core and the front end surface of the middle axis.

6. A misfire detector device for use in internal combustion engine as recited in claim 1, 2 or 3, wherein an electrical connection is such that the projected front end of the center electrode is in the side of negative polarity.

* * * * *